(12) United States Patent
Lee et al.

(10) Patent No.: US 9,819,005 B2
(45) Date of Patent: Nov. 14, 2017

(54) SECONDARY BATTERY

(71) Applicant: SAMSUNG SDI CO., LTD., Yongin-si, Gyeonggi-do (KR)

(72) Inventors: Won-Jun Lee, Yonin-si (KR); Sang-Won Byun, Yongin-si (KR); Hong-Hyeon Lee, Yongin-si (KR)

(73) Assignee: SAMSUNG SDI CO., LTD., Yongin-si, Gyeonggi-Do (KR)

( * ) Notice: Subject to any disclaimer, the term of this patent is extended or adjusted under 35 U.S.C. 154(b) by 37 days.

(21) Appl. No.: 14/668,360

(22) Filed: Mar. 25, 2015

(65) Prior Publication Data
US 2015/0280205 A1    Oct. 1, 2015

(30) Foreign Application Priority Data

Apr. 1, 2014    (KR) .......................... 10-2014-0038590

(51) Int. Cl.
*H01M 2/34*    (2006.01)
*H01M 2/26*    (2006.01)
*H01M 10/04*    (2006.01)

(52) U.S. Cl.
CPC ............. *H01M 2/348* (2013.01); *H01M 2/26* (2013.01); *H01M 10/0413* (2013.01); *H01M 10/0431* (2013.01); *H01M 2/345* (2013.01); *H01M 2200/103* (2013.01); *H01M 2200/20* (2013.01)

(58) Field of Classification Search
CPC ........ H01M 2/348; H01M 2/345; H01M 2/26; H01M 10/0413; H01M 10/0431
See application file for complete search history.

(56) References Cited

U.S. PATENT DOCUMENTS

| 2013/0011699 A1* | 1/2013 | Kim ....................... H01H 85/36 |
| | | 429/7 |
| 2013/0101870 A1 | 4/2013 | Byun et al. |
| 2013/0143080 A1 | 6/2013 | Byun |

FOREIGN PATENT DOCUMENTS

| KR | 2013-0044965 A | 5/2013 |
| KR | 2013-0063247 A | 6/2013 |

* cited by examiner

*Primary Examiner* — Helen O Conley
(74) *Attorney, Agent, or Firm* — Lee & Morse, P.C.

(57) ABSTRACT

A secondary battery including an electrode assembly, the electrode assembly including a first electrode, a second electrode, and a separator; a case accommodating the electrode assembly therein; a cell cover sealing the case; and a first terminal unit having one end that is electrically connected to the first electrode of the electrode assembly and having another end extracted to an outside of the case, wherein the first terminal unit includes a first collector in the case and electrically connected to the first electrode of the electrode assembly, the first collector having a fuse area; and an arc cutting block adjacent to the fuse area of the first collector, the arc cutting block being movable to a position previously occupied by the fuse area in the event that the fuse area is cut off, and cutting an arc generation path.

10 Claims, 5 Drawing Sheets

SECONDARY BATTERY

CROSS-REFERENCE TO RELATED APPLICATION

Korean Patent Application No. 10-2014-0038590, filed on Apr. 1, 2014, in the Korean Intellectual Property Office, and entitled: "Secondary Battery," is incorporated by reference herein in its entirety.

BACKGROUND

1. Field

Embodiments relate to a secondary battery.

2. Description of the Related Art

Unlike primary batteries, secondary batteries are batteries that can be repeatedly charged and discharged. Small-capacity secondary batteries may be used in portable compact electronic devices such as cellular phones, notebook computers, and camcorders, and large-capacity secondary batteries may be used as power sources for driving motors of hybrid vehicles, etc.

A secondary battery may include an electrode assembly formed by respectively providing positive and negative electrodes to both surfaces of a separator, a case accommodating the electrode assembly therein, a cell cover sealing an opening of the case, and an electrode terminal passing through the cell cover and electrically connected to the electrode assembly.

SUMMARY

Embodiments are directed to a secondary battery.

The embodiments may be realized by providing a secondary battery including an electrode assembly, the electrode assembly including a first electrode, a second electrode, and a separator; a case accommodating the electrode assembly therein; a cell cover sealing the case; and a first terminal unit having one end that is electrically connected to the first electrode of the electrode assembly and having another end extracted to an outside of the case, wherein the first terminal unit includes a first collector in the case and electrically connected to the first electrode of the electrode assembly, the first collector having a fuse area; and an arc cutting block adjacent to the fuse area of the first collector, the arc cutting block being movable to a position previously occupied by the fuse area in the event that the fuse area is cut off, and blocking an arc generation path.

The fuse area may have a sectional area that is smaller than a sectional area of another region of the first collector.

The first terminal unit may include a first electrode terminal having one side exposed at a top surface of the cell cover, and having another side that is electrically connected to the first collector.

The first collector may have a structure in which the first electrode terminal is coupled with a plate-shaped side thereof, and another side is bent, extends downwardly, and may be electrically connected to the first electrode of the electrode assembly.

The first electrode terminal may include an external electrode on the cell cover; and a rivet terminal having a lower end that contacts the first collector, and an upper end that is coupled with the external electrode by passing through the cell cover.

The first terminal unit may include an upper insulating member on a top of the cell cover; and a lower insulating member on a bottom of the cell cover, the lower insulating member having one opened side through which a portion of the first collector is mounted.

The first terminal unit may include an insert molding portion being coupled with the lower insulating member, covering the fuse area of the first collector, and having a gas exhaust hole aligned with the fuse area.

The arc cutting block may include an insulating block on a top of the fuse area; and a plate on the fuse area and coupled with the insulating block, the plate sealing the gas exhaust hole of the insert molding portion.

The insulating block may be movable into the position that was occupied by the fuse area in response to pressure applied to the plate by arc gas generated when the fuse area is damaged.

A width of the insulating block may be greater than a width of the gas exhaust hole.

The insulating block may include one or more coupling projections protruding therefrom, the one or more coupling projections being coupled and fixed to one or more coupling holes in the plate.

BRIEF DESCRIPTION OF THE DRAWINGS

Features will be apparent to those of skill in the art by describing in detail exemplary embodiments with reference to the attached drawings in which.

DETAILED DESCRIPTION

Figure 1A:
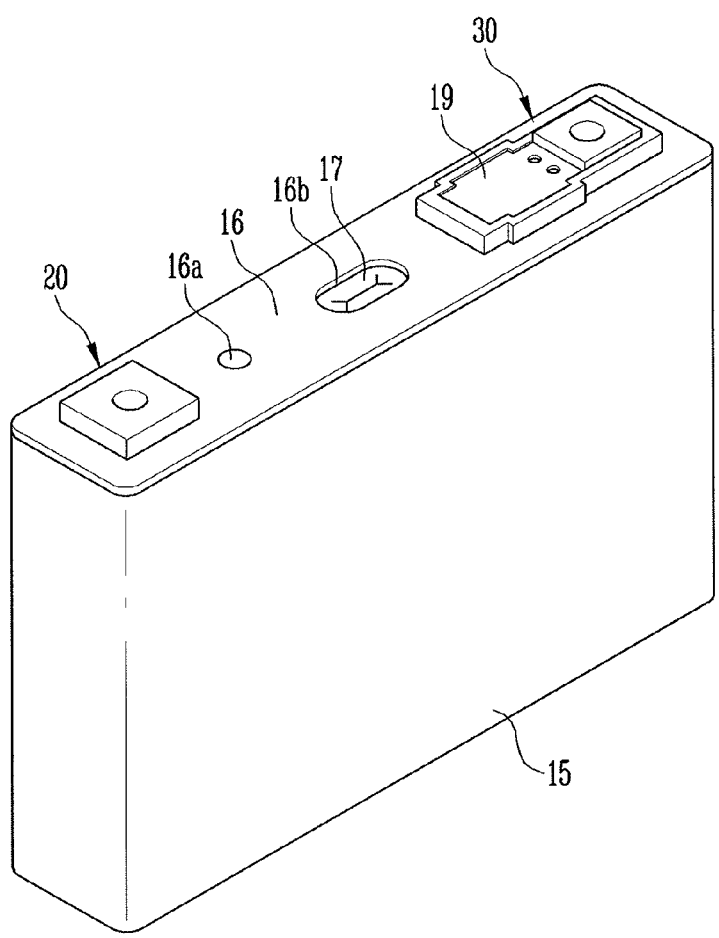
FIG. 1A illustrates a perspective view of a secondary battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

In addition, when an element is referred to as being "on" another element, it can be directly on the other element or be indirectly on the other element with one or more intervening elements interposed therebetween. Also, when an element is referred to as being "connected to" another element, it can be directly connected to the other element or be indirectly connected to the other element with one or more intervening elements interposed therebetween.

Figure 1B:
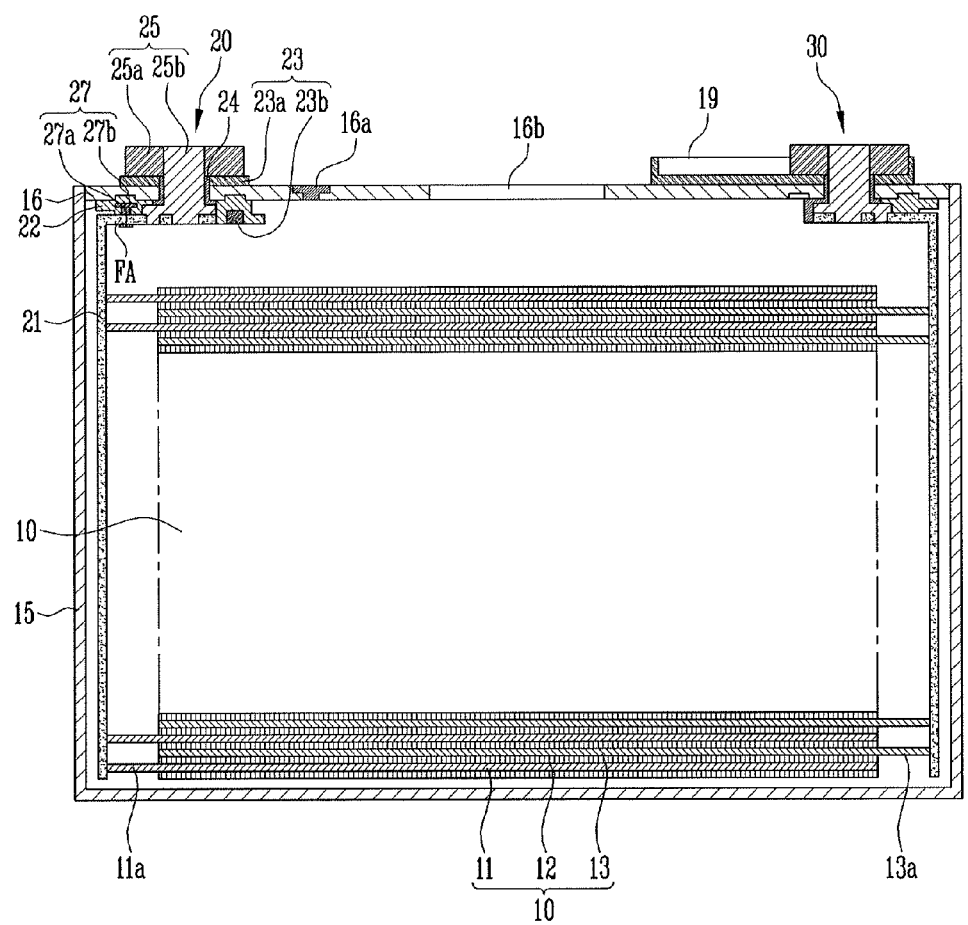
FIG. 1B illustrates a sectional view of the secondary battery of FIG. 1A.

FIG. 1A illustrates a perspective view of a secondary battery according to an embodiment. FIG. 1B illustrates a sectional view of the secondary battery of FIG. 1A.

Referring to FIGS. 1A and 1B, the secondary battery according to this embodiment may include an electrode assembly 10, a case 15, a cell cover 16, an external short-circuit portion 19, a first terminal unit 20, and a second terminal unit 30.

An implementation in which the secondary battery according to this embodiment is a cuboid-shaped lithium ion secondary battery will be described as an example. However, the embodiments may be applied to various types of batteries, e.g., a lithium polymer battery, a cylinder-type battery, or the like.

The electrode assembly 10 may include a first electrode 11, a separator 12, and a second electrode 13. For example, the electrode assembly 10 may be formed by winding or overlapping a stacked structure of the first electrode 11, the separator 12, and the second electrode 13, which may be formed in the shape of a thin plate or film. In an implementation, the first electrode 11 may act as a positive electrode, and the second electrode 13 may act as a negative electrode.

The first and second electrodes 11 and 13 may be divided into a coating portion (at which an active material is coated on an electrode body), and first and second electrode non-coating portions 11a and 13a (at which the active material is not coated on the electrode body). In an implementation, the coating portion may form most of the first and second electrodes 11 and 13 in the electrode assembly 10, and the first and second electrode non-coating portions 11a and 13a may be respectively at both sides of the coating portion in a jelly roll state.

In an implementation, and the electrode assembly 10 may be formed into a structure in which the first and second electrodes 11 and 13 (each configured with a plurality of sheets) are stacked with the separators 12 interposed therebetween.

The separator 12 may be between the first and second electrodes 11 and 13 to help prevent a short circuit and to facilitate movement of lithium ions. The separator 12 may be made of, e.g., polyethylene, polypropylene, or composite film of the polyethylene and the polypropylene.

The case 15 may accommodate the electrode assembly 10 therein, and the cell cover 16 may seal the case 15. For example, the case 15 may be formed in an approximately rectangular parallelepiped shape so that a space for accommodating the electrode assembly 10 and an electrolyte is set inside the case 15, and an opening (through which the space inside the case 15 is connected to an outside of the case 15) may be at one surface or side of the rectangular parallelepiped. The opening facilitates insertion of the electrode assembly 10 into the case 15. The cell cover 16 (e.g., formed of or as a thin steel plate) may be provided in the opening of the case 15, to seal the case 15.

The cell cover 16 (e.g., cap plate) may be provided with an electrolyte injection hole 16a (which may be sealed with a stopper) and a vent hole 16b. The vent hole 16b may be sealed with a vent plate 17 so that an internal pressure of the secondary battery may be discharged therethrough. If the internal pressure of the secondary battery reaches or exceeds a predetermined pressure, the vent plate 17 may be cut away or burst to open the vent hole 16b. The vent plate 17 may be provided with a notch for guiding the vent plate 17 to be cut away.

The external short-circuit portion 19 may be provided on a part of the cell cover 16. The external short-circuit portion 19 may cause or induce a short circuit by coming into contact with a predetermined short-circuit member (not shown) when the internal pressure of the secondary battery is greater than the predetermined pressure. The external short-circuit portion 19 may be provided together with, e.g., a circuit for equalizing a charging state by controlling charging and discharging of the secondary battery, a circuit for preventing overdischarging and overcharging of the secondary battery, or the like. For example, the external short-circuit portion 19 may include a protective device such as a thermistor or a temperature fuse. These devices may block current when the voltage and current of the secondary battery are higher than those specified (e.g., due to a high-temperature increase of the secondary battery or excessive charging/discharging), so that it is possible to help prevent a risk such as fracture, combustion, or the like of the secondary battery.

The first and second terminal units 20 and 30 may be electrically connected to the electrode assembly 10 inside the case 15 to provide a path through which the electrode assembly 10 is electrically connected outside of the case 15. For example, the first and second terminal units 20 and 30 may pass through the cell cover 16 to be electrically connected to the electrode assembly 10. In an implementation, the first terminal unit 20 may be electrically connected to the first electrode 11 of the electrode assembly 10, and the second terminal unit 30 may be electrically connected to the second electrode 13 of the electrode assembly 10. Thus, the electrode assembly 10 may be electrically connected outside of the case 15 through the first and second terminal units 20 and 30. In an implementation, the first and second terminal units 20 and 30 may be substantially made of the same structure and material, and therefore, only the first terminal unit 20 will be described below.

The first terminal unit 20 may include a first collector 21, an insert molding portion 22, an insulating member 23, a gasket 24, a first electrode terminal 25, and an arc cutting block 27.

The first collector 21 may be accommodated in the case 15, may be electrically connected to the first electrode 11 of the electrode assembly 10, and may include a fuse area FA. The first collector 21 may be formed of or may include a conductive material (such as a metal) to provide a conduction path between the electrode assembly 10 and the first electrode terminal 25. The first collector 21 may have shape bent in a 'Γ' or an inverted L-shape. One side (with respect to the bent portion of the first collector 21) may be positioned between a side portion of the case 15 and the electrode assembly 10 to contact the first electrode 11 of the electrode assembly 10, and another side (with respect to the bent portion of the first collector 21) may be positioned between the cell cover 16 and a top surface of the electrode assembly 10 to contact the first electrode terminal 25. The fuse area FA may be positioned adjacent to the bent portion (e.g., a middle portion of both the sides).

The insert molding portion 22 may be coupled with the insulating member 23 to cover the fuse area FA of the first collector 21, and may have a gas exhaust hole corresponding to, aligned with, surrounding, or underlying the fuse area FA. The insert molding portion 22 may be formed by insert-molding a part of the first collector 21 (including the fuse area FA). The insulating member 23 may include an upper insulating member 23a on a top or outer side of the cell cover 16, and a lower insulating member 23b on a bottom or inner side of the cell cover 16. The lower insulating member 23b may have one opened side through or at which the fuse area FA of the first collector 21 is mounted. For example, the insert molding portion 22 and the insulating member 23 may be formed of polypropylene (PP) or polyphenylenesulfide (PPS).

The gasket 24 may be formed of or may include an insulating material and may surround the first electrode terminal 25 passing through the cell cover 16. For example, the gasket 24 may be interposed between a rivet terminal 25b of the first electrode terminal 25 and the cell cover 16 to seal therebetween. The gasket 24 may help prevent external moisture from penetrating into the secondary battery and/or may help prevent the electrolyte inside the secondary battery from being discharged to the outside of the secondary battery.

One side of the first electrode terminal 25 may be exposed to or at the top surface or side of the cell cover 16, and another side of the first electrode terminal 25 may be electrically connected to the first collector 21. The first electrode terminal 25 may include an external electrode 25a and the rivet terminal 25b. The rivet terminal 25b may include a lower end portion contacting the first collector 21 and an upper end portion coupled with the external electrode 25a by passing through the cell cover 16.

The arc cutting block 27 may be adjacent to the fuse area FA of the first collector 21, and may cut, disrupt, or block an arc generation path by moving to the position of the fuse area FA (e.g., previously occupied by the fuse area FA) after the fuse area FA is cut off (e.g., after the fuse area FA is tripped or melted). The arc cutting block 27 may include an insulating block 27a (on the top of the fuse area FA) and a plate 27b (on the bottom of the fuse area FA and coupled with the insulating block 27a). The plate 27b may seal the gas exhaust hole of the insert molding portion 22.

If the secondary battery were to be overcharged, the first and second terminal portions 20 and 30 may be short-circuited. Therefore, very high current may flow, and heat may be generated. The fuse area FA in the first collector 21 may be cut off by the generated heat (e.g., may be tripped or melted), and therefore, the electrical connection of the secondary battery may be cut off. Meanwhile, if an external short circuit were to occur in the secondary battery, a current path in the direction of the electrode assembly 10 and the second terminal unit 30 from the first terminal unit 20 may be formed in the secondary battery. In this state, as the fuse area FA in the first collector 21 is melted, an arc and/or gas caused by the arc may be generated. Thus, the arc cutting block 27 may help guide the gas generated at the fuse area FA of the first collector 21 to be exhausted through the gas exhaust hole of the insert molding portion 22, and may cut or disrupt an arc generation path by moving to the space previously occupied by the fuse area FA and blocking the cut portion of the first collector 21. The first terminal unit 20 including the arc cutting block 27 will be described in detail below.

Figure 2A:
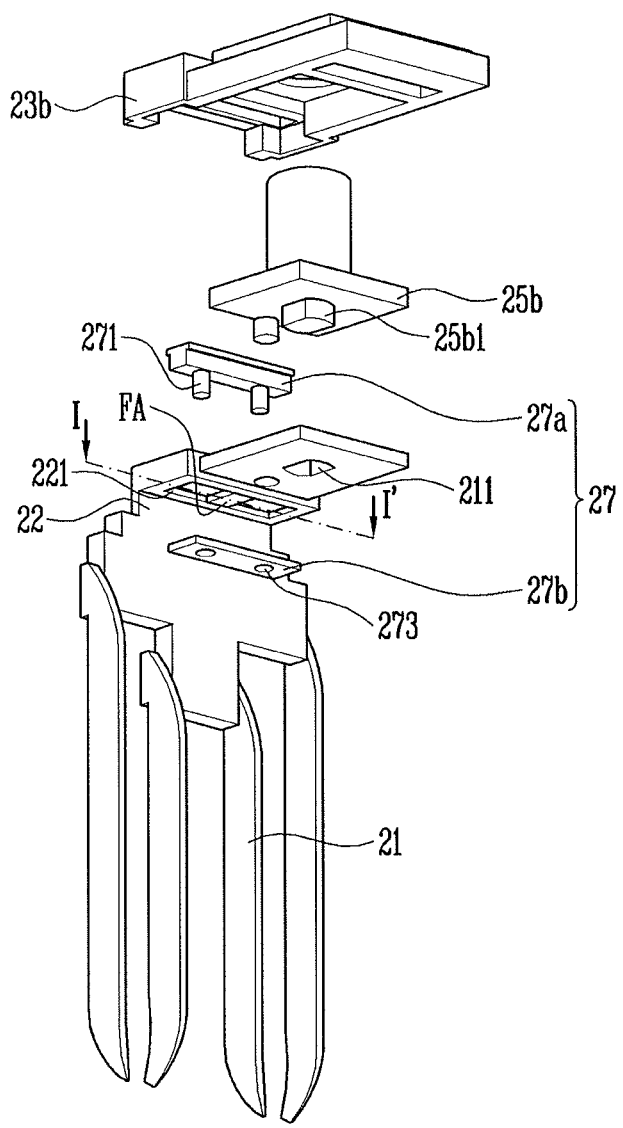
FIG. 2A illustrates an exploded perspective view of a terminal unit according to the embodiment.
Figure 2B:
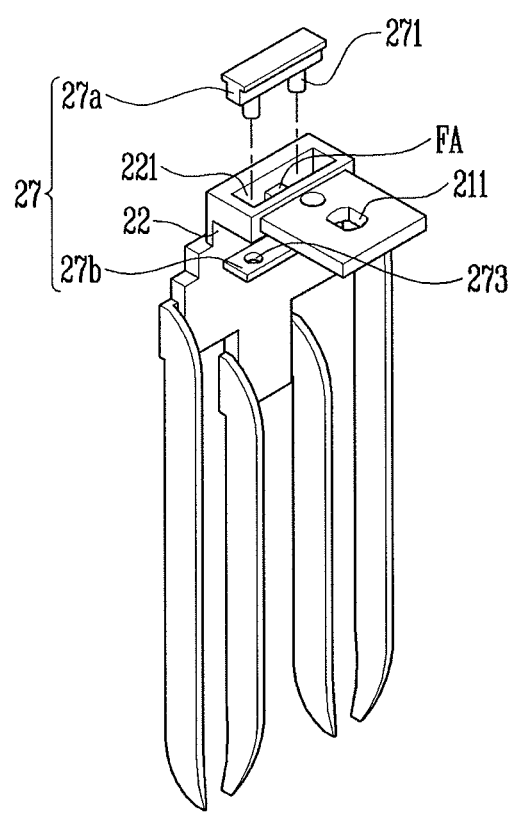
FIG. 2B illustrates an exploded perspective view from a top side of a first collector and an insert molding portion.
Figure 3A:
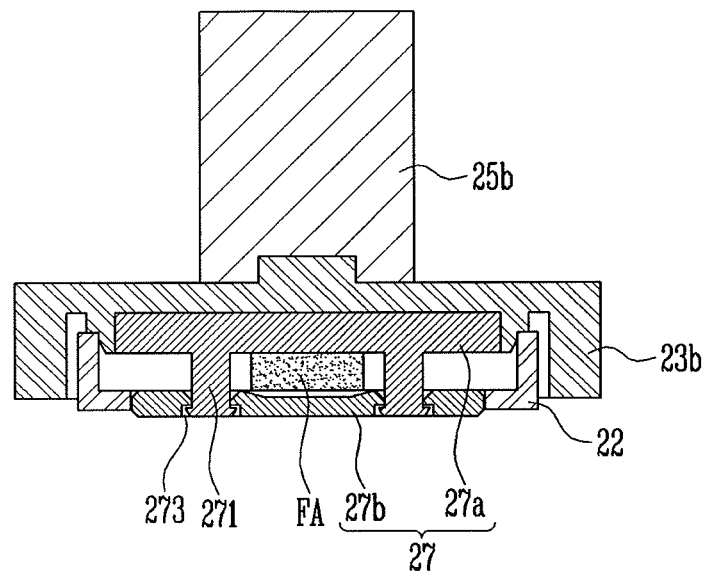
FIGS. 3A and 3B illustrate sectional views showing an operation of an arc cutting block of FIGS. 2A and 2B.
Figure 3B:
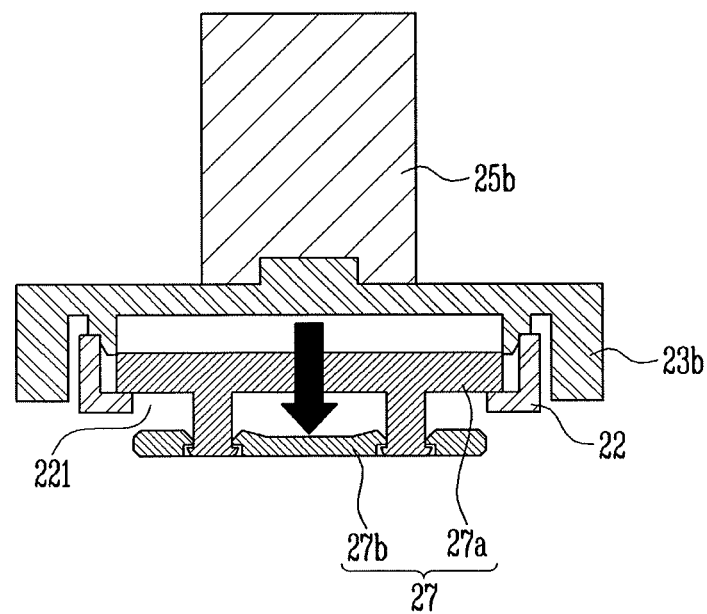

FIG. 2A illustrates an exploded perspective view of the terminal unit according to the embodiment, and FIG. 2B is an exploded perspective view from a top side of a first collector and an insert molding portion. FIGS. 3A and 3B illustrate sectional views showing an operation of the arc cutting block of FIGS. 2A and 2B.

Referring to FIGS. 2A, 2B, 3A, and 3B, the first collector 21 may have a structure in which the first electrode terminal 25 is coupled with one plate-shaped side thereof, and the other side thereof may be bent to extend downwardly. One or more terminal holes 211 may be formed at one side or end of the first collector 21 so that the first collector 21 may be coupled with the first electrode terminal 25 therethrough. The fuse area FA may be positioned in a middle area of the bent portion of the first collector 21, and the insert molding portion 22 may cover or surround the fuse area FA and the middle area of the bent portion of the first collector 21 from or at the bottom thereof.

The fuse area FA may have a sectional area that is smaller than that of another region or area of the first collector 21. For example, the fuse area FA may have a width that is narrower than an overall width of the first collector 21 to increase electrical resistance. In an implementation, only one fuse area FA may be included.

When high current flows in the first collector 21 (e.g., due to the occurrence of a short circuit in the secondary battery), heat may be generated and the fuse area FA may be melted by the generated heat. Thus, the fuse area FA may perform a function of cutting off the flow of current between the first electrode terminal 25 and the electrode assembly 10.

The insert molding portion 22 may be coupled with a lower end of the lower insulating member 23b while supporting the fuse area FA of the first collector 21. The insert molding portion 22 may have a gas exhaust hole 221 corresponding to, aligned with, surrounding, or underlying the fuse area FA.

The lower insulating member 23b may be provided between the cell cover 16 and the first collector 21 to electrically insulate the cell cover 16 and the first collector 21 from each other. One side of the lower insulating member 23b may be coupled with the cell cover 16; and the first collector 21, the insert molding portion 22, and the rivet terminal 25b may be surrounded by another side of the lower insulating member 23b, thereby stabilizing the structure of the cell cover 16, the first collector 21, the insert molding portion 22, and the rivet terminal 25b. In an implementation, the lower insulating member 23b may have a concave structure with a shape corresponding or complementary to the components accommodated therein.

The rivet terminal 25b of the first electrode terminal 25 may have a column shape. For example, the column shape of the rivet terminal 25b may extend upwardly and may protrude by passing through the lower insulating member 23b. One or more terminal projections 251b (coupled with the one or more terminal holes 211 of the first collector 21) may be provided at a lower end portion of the rivet terminal 25b.

The arc cutting block 27 may be positioned between the lower insulating member 23b and the insert molding portion 22. The arc cutting block 27 may have a structure that surrounds the fuse area FA, and may be fixed to and supported by the lower insulating member 23b and the insert molding portion 22 in a state in which the arc cutting block 27 has the fuse area FA interposed or accommodated therein, e.g., during normal operation of the battery. In an implementation, the arc cutting block 27 may be configured with a plurality of parts that are coupled with one another.

In the present embodiment, the arc cutting block 27 may have the insulating block 27a on the top of the fuse area FA, and the plate 27b on the bottom of the fuse area FA and coupled with the insulating block 27a. The plate 27b may seal the gas exhaust hole 221 of the insert molding portion 22, e.g., during normal operation of the battery. The insulating block 27a and the plate 27b may be formed with plate shapes opposite to each other, and may have a structure in which one or more coupling projections 271 (protruding from the lower end of the insulating block 27a) are coupled with and fixed to one or more coupling holes 273 of the plate 27b. As shown in FIG. 3A, the coupling projections 271 may be positioned at side portions, e.g., both side portions, of the fuse area FA, and may be forcibly inserted into the respective coupling holes 273 of the plate 27b.

The arc cutting block 27 may cut, block, or otherwise disrupt the arc generation path by moving to the position formerly occupied by the fuse area FA when the fuse area FA is damaged (e.g., tripped or melted) by a short circuit. For example, as shown in FIG. 3B, if pressure is applied to the plate 27b by the expansion of arc gas generated when the fuse area FA is damaged, the plate 27b may open the gas exhaust hole 221 by moving downwardly, e.g., inwardly. For example, the fuse area FA may be evaporated and disappeared. In this state, the plate 27b may move downwardly and, simultaneously, the insulating block 27a may move downwardly, so that the cut portion may be blocked (e.g., thereby preventing arcing). In an implementation, a sectional width of the insulating block 27a may be greater than a width of the gas exhaust hole 221, and the insulating block 27a may have a latching structure that helps prevent the arc cutting block 27 from being completely separated. For example, during normal operation of the battery, the arc cutting block 27 may include the insulating block 27a overlying and/or resting on the fuse area FA and the plate 27b underlying the fuse area FA and blocking the gas exhaust hole 221. In the event that the fuse area FA is melted (e.g., the fuse is tripped), the arc cutting block 27 moves inwardly in the battery such that the exhaust hole 221 is opened (e.g., the pate 27b moves out of the way) and the insulating block moves to the space that was occupied by the fuse area FA (e.g., between the disconnected sections of the first collector 21) in order to prevent an arc from occurring between the disconnected sections of the first collector 21.

By way of summation and review, the secondary battery may be repeatedly charged and discharged, and excessive heat may be generated inside the case, or an electrolyte may be decomposed. The generation of heat or the decomposition of the electrolyte may increase an internal pressure of the secondary battery. The increase of the internal pressure may cause combustion and/or explosion of the secondary battery.

In order to help prevent the combustion or explosion of the secondary battery (e.g., caused by the increase of the internal pressure), an external short-circuit portion may be provided to or at an exterior of the case. In the increase of the internal pressure of the secondary battery, the external short-circuit portion may facilitate short-circuiting of the positive and negative electrodes of the electrode assembly from the exterior of the secondary battery. If the external short-circuit portion is operated so that a short circuit occurs, a charging state of the electrode assembly may be lowered due to high-current discharging. Therefore, a weak portion in a discharging line for connecting the electrode assembly and an electrode terminal may be melted and then cut due to the high-current discharging.

In order to effectively cut the discharging line in an external short circuit or overcharging, the secondary battery may have a fuse area in a collector (that connects the electrode terminal and the electrode assembly). If the fuse area is melted and then cut due to the external short circuit, an arc may still be generated in a gap between the cut fuse areas. The generated arc may be transferred to not only the fuse area but also another area of the secondary battery, and a fire or explosion may still result. In view of the above, a secondary battery may have improved safety against an external short circuit.

The embodiments may provide a secondary battery that is capable of preventing an accident by preventing the generation of an arc after a fuse area is cut.

According to an embodiment, the arc cutting block for cutting an arc generation path by moving to the position of the fuse area after the fuse area is cut off may be provided, and it is possible to help prevent an accident caused by the generation of an arc, thereby improving the safety of the secondary battery.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A secondary battery, comprising:
   an electrode assembly, the electrode assembly including a first electrode, a second electrode, and a separator;
   a case accommodating the electrode assembly therein;
   a cell cover sealing the case; and
   a first terminal unit having one end that is electrically connected to the first electrode of the electrode assembly and having another end extracted to an outside of the case,
   wherein the first terminal unit includes:
   a first collector in the case and electrically connected to the first electrode of the electrode assembly, the first collector having a meltable fuse area; and
   an arc cutting block adjacent to the meltable fuse area of the first collector, the arc cutting block:
      being movable to a position previously occupied by the meltable fuse area in an event that the meltable fuse area is melted and cut off, and
      blocking an arc generation path,
   wherein the arc cutting block includes an insulating block on a top of the meltable fuse area; and a plate on a bottom of the meltable fuse area and coupled with the insulating block such that the meltable fuse area is between the insulating block and the electrode assembly and the position previously occupied by the meltable fuse area in an event that the meltable fuse area is melted and cut off is closer to the electrode assembly than a position of the insulating block when the meltable fuse area is in an unmelted state, and
   wherein the plate defines a gas exhaust hole space surrounding the meltable fuse area that is open or closed according to a location of the plate along a vertical direction, a width of the insulation block being wider than that of the gas exhaust hole.

2. The secondary battery as claimed in claim 1, wherein the meltable fuse area has a sectional area that is smaller than a sectional area of another region of the first collector.

3. The secondary battery as claimed in claim 1, wherein the first terminal unit includes a first electrode terminal having one side exposed at a top surface of the cell cover, and having another side that is electrically connected to the first collector.

4. The secondary battery as claimed in claim 3, wherein the first collector has a structure in which the first electrode terminal is coupled with a plate-shaped side thereof, and another side is bent, extends downwardly, and is electrically connected to the first electrode of the electrode assembly.

5. The secondary battery as claimed in claim 3, wherein the first electrode terminal includes:
   an external electrode on the cell cover; and
   a rivet terminal having:
      a lower end that contacts the first collector, and
      an upper end that is coupled with the external electrode by passing through the cell cover.

6. The secondary battery as claimed in claim 1, wherein the first terminal unit includes:

an upper insulating member on a top of the cell cover; and
a lower insulating member on a bottom of the cell cover, the lower insulating member having one opened side through which a portion of the first collector is mounted.

7. The secondary battery as claimed in claim 6, wherein the first terminal unit includes an insert molding portion being coupled with the lower insulating member, covering the meltable fuse area of the first collector, and having the gas exhaust hole aligned with the meltable fuse area.

8. The secondary battery as claimed in claim 7, wherein the plate seals the gas exhaust hole of the insert molding portion.

9. The secondary battery as claimed in claim 8, wherein the insulating block is movable into the position that was occupied by the meltable fuse area in response to pressure applied to the plate by arc gas generated when the meltable fuse area is damaged.

10. The secondary battery as claimed in claim 8, wherein the insulating block includes one or more coupling projections protruding therefrom, the one or more coupling projections being coupled and fixed to one or more coupling holes in the plate.

* * * * *